United States Patent Office 3,496,147
Patented Feb. 17, 1970

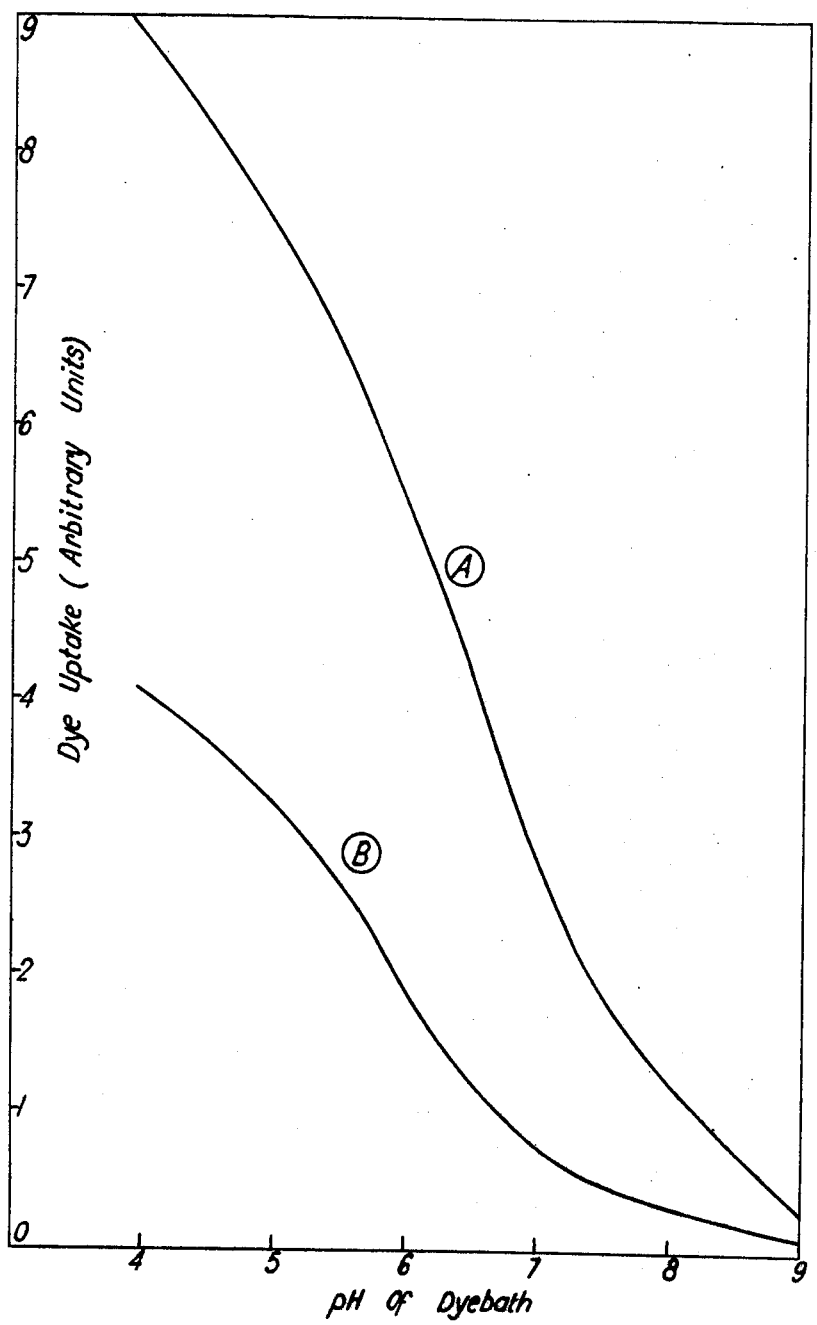

3,496,147
POLYAMIDES CONTAINING MONOFUNCTIONAL PHOSPHONIUM COMPOUND
Robert C. P. Cubbon, Abergavenny, Monmouthshire, England, assignor to British Nylon Spinners Limited, Pontypool, England
Filed June 4, 1965, Ser. No. 461,431
Claims priority, application Great Britain, June 9, 1964, 23,780/64
Int. Cl. C08g 20/20
U.S. Cl. 260—78       2 Claims

ABSTRACT OF THE DISCLOSURE

A process for the manufacture of high molecular weight linear polyamides suitable for the production of filaments, films and other shaped articles, wherein defined monofunctional amide-forming phosphonium compounds are used for stabilising polymer viscosity. Representative phosphonium compounds are triphenyl carboxyalkyl phosphonium halide and diphenyl ethyl carboxyalkyl phosphonium halide. The phosphonium stabiliser may be added at any stage of the polymerization. Films, filaments and other shaped articles derived from the thus stabilised polyamides are also disclosed. These shaped products are characterized by enhanced dyeability in regard to anionic dyestuffs.

---

The present invention relates to improvements in the manufacture of polymers and more particularly it is concerned with the manufacture of linear polyamides of high molecular weight, and with filaments, films and other shaped articles derived therefrom.

Linear polyamides of high molecular weight, suitable for the production of filaments and other shaped articles, may be made by submitting an amino-carboxylic acid or else a diamine and a dicarboxylic acid to a process of condensation polymerisation as described in British patent specifications Nos. 461,236 and 461,237, for example, by heating omega aminocaproic acid or a mixture of equimolecular proportions of hexamethylene diamine and adipic acid. Instead of the amino acid or amine and acid, functional derivatives thereof capable of forming amides, may be employed. For instance, an ester of a dicarboxylic acid or the lactam of the amino acid may be used. The degree of polymerisation attained may be controlled by the physical conditions employed, for example, the duration of the heating, but the resulting polyamide would then be sensitive to further heating, which is applied for the purpose of shaping the polyamides into filaments and other useful articles, when the polyamide is melt-spun. When heated again, such a polyamide would undergo further condensation, causing an increase in the average molecular weight and a rise in viscosity. It has consequently been the practice to make use of certain chemical compounds as additives known as viscosity stabilisers during the course of the condensation. As the name indicates, these compounds are added in order to control the viscosity, or, in other words, the degree of polymerisation or average molecular weight. The intimate relationship that exists between molecular weight and the viscosity of polyamides is well-known, and has, for example, been discussed in some detail by Mark in "Physical Chemistry of High Polymeric Systems," vol. II. Interscience Publications Inc., 1960.

Thus, it has been proposed in British specification No. 490,790 to make polyamides in the presence of monofunctional carboxylic acids or monofunctional nitrogenous bases, for example, lauric acid, and monoamines such as methylamine, dimethylamine and cyclohexylamine, which function by reacting with the amine or carboxylic acid groups in the polyamide to form amides.

It has now been found that certain monofunctional phosphonium compounds are useful viscosity stabilisers in the manufacture of polyamides.

Accordingly, the invention in one of its aspects, resides in a process for the manufacture of high molecular weight linear polyamides suitable for the production of filaments, films and other shaped articles, which comprises heating an amino acid or an approximately equimolecular mixture of a diamine and a dicarboxylic acid, which amino acid or diamine and/or dicarboxylic acid may be in the form of amide-yielding functional derivatives, or a polyamide obtained from said amino acid or diamine and dicarboxylic acid, or amide-yielding functional derivatives thereof, in the presence of a molecular proportion of less than five percent (calculated on the aforesaid amino acid or dicarboxylic acid or functional derivative thereof) of a monofunctional amide-forming phosphonium compounds.

Preferably, the monofunctional phosphonium compound is used in amounts of between 0.01 and 2 mole percent.

These monofunctional phosphonium compounds have the general formula:

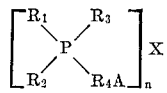

wherein at least one of $R_1$, $R_2$ and $R_3$ are hydrocarbon groups while the others may be hydrogen atoms, $R_4$ is an alkylene, arylene or aralkylene group, A is a carboxylic acid group, an amino group or a group which is capable of functioning as a carboxylic acid group or an amino group under the conditions of the process, and X is an anion and $n$ has a value which corresponds to the valency of the anion X.

Conveniently all of the groups $R_1$, $R_2$ and $R_3$ are hydrocarbon groups, and X is a halide radical; when X is a halide radical, $n$ has the value 1.

When any of $R_1$, $R_2$ and $R_3$ are aryl groups, for example phenyl, the aryl group may be substituted, for example, with methyl or methoxy.

When $R_4$ is a straight chain alkylene group having the formula $-(CH_2)_n-$, preferably $n$ has a value 3.

Examples of phosphonium compounds which may be used according to the present invention are:

triphenyl carboxyalkyl phosphonium halide
diphenyl ethyl carboxyalkyl phosphonium halide
tributyl carboxyalkyl phosphonium halide
methyl ethyl phenyl carboxyalkyl phosphonium halide
dibutyl ethyl amino alkyl phosphonium halide
tributyl amino alkyl phosphonium halide
triphenyl amino alkyl phosphonium halide
tri-para-anisly carboxyalkyl phosphonium halide The monofunctional phosphonium compound may be added at any stage of the polymerisation which may be regarded as continuing until the substantial attainment of the chemical equilibrium between polymerisation and depolymerisation corresponding to the required degree of polymerisation. The polymerisation may be carried out continuously or batch-wise, or indeed in separate stages. The invention includes filaments, films and other shaped articles made from the stabilised polyamides. For example, the polyamides may be melted and spun from the melt into filaments. It is thus also contemplated to add the monofunctional phosphonium compounds to such a melt, whereupon the polymerisation-depolymerisation equilibrium of the previously unstabilised polyamide will be readjusted so as to correspond to the required degree of polymerisation.

By way of example of acid and/or amine starting materials there may be employed, for instance, omega-aminocaproic acid, epsilon caprolactam, pentamethylene diamine and sebacic acid, hexamethylene diamine and adipic acid, decamethylene diamine and ethyl adipate, hexamethylene diamine and adipic acid, adipic acid and N-formyl derivatives of hexamethylene diammonium, hexamethylene diammonium adipate, omega-aminolauric acid or hexamethylene diamine and sebacic acid.

The condensation polymerisation may be carried out in the absence of air or oxygen and optionally, in the presence of an inert gas such as nitrogen. Prevision may be made, if desired, for the absorption or removal of water, hydrogen chloride or other compounds that may be eliminated during the course of the condensation, which may be effected in the presence or absence of an inert diluent, for example, benzene, to moderate the vigor of the reaction. Delustrants, pigments, dyestuffs, plasticisers, and other additives may be introduced into the polyamide at any stage of the polymerisation, included in the starting material, or added to the final polyamide.

When the polyamide is being made, the course of the polymerisation may be followed by measuring the viscosity. For this purpose it is convenient to determine the "inherent viscosity" (expressed hereinafter in abbreviated form as "I.V.") of the polyamide which is defined as the ratio of the viscosity of an 0.5 percent weight by weight solution of the polyamide in 90 percent aqueous phenol at 25° C., to the viscosity of 90 percent aqeous phenol at the same temperature; thus, the further the polymerisation proceeds the higher becomes the inherent viscosity of the polyamide. When the polyamide is adequately stabilised, additional heating produces little or no further change in the inherent viscosity because equilibrium has been attained, or very nearly attained. Moreover the degree of polymerisation reached at equilibrium, and hence the ultimate value of the inherent viscosity depends on the quantity of stabiliser employed, and on its effectiveness.

Consequently the usefulness of a stabiliser can be gauged by measuring the inherent viscosity of the resultant polyamide.

Utilisation of the monofuctional phosphonium compounds as stabilisers in the process of the present invention has the important advantage that the resultant polyamides have an enhanced dyeability in regard to anionic dyestuffs. This enhanced dyeability is expressed in a higher value for the equilibrium dye uptake. It is well understood that this uptake is closely related to the number of amino end groups in the polyamide, in other words its basic nature, and in these terms the facility with which the phosphonium halide stabilised polyamides of this invention take up anionic dyestuffs is explained by the enhanced basicity of the polyamides attributable to the presence of phosphorous atoms. Moreover the phosphonium compounds are generally less volatile than carboxylic acids or nitrogenous bases and consequently less likely to escape from the hot reaction zone.

The advantage of the phosphonium compounds from the dyeing point of view is conveniently estimated by measuring the uptake of an anionic dyestuff when the dyeing process has reached equilibrium, which is known as the equilibrium dye uptake (abbreviated as E.D.U.). Equilibrium anionic dye uptake measurements are referred to at page 625 of the Journal of the Textile Institute, vol. 41, No. 7, July 1950 in an article entitled "Measurement of Dyeing Properties and Correlation with Orientation in Nylon Flm." In testing the present polyamides the acid dyestuff used Solway Blue B.N. (registered trademark) which is also identified as Colour Index Acid Blue 45. The polyamide is immersed in the dye liquor, maintained at 212° F., and kept there until equilibrium is attained, that is, until dyestuff ceases to be taken up. The uptake of dyestuff may be measured directly on the dyed polyamide, or indirectly be determining the dyestuff still remaining in the dye liquor. In either case the quantity of dyestuff is determined by spectrophotometric techniques, the dyed polyamide being first dissolved, for example, in a 40 percent aqueous solution of sulphuric acid.

The following examples illustrate but do not limit the invention.

EXAMPLE 1

Preparation of triphenyl omega-carboxy-n-decyl phosphonium bromide

Triphenyl omega-carboxy-n-decyl phosphonium bromide is prepared by a reaction represented by the formula:

$$PH_3P + Br(CH_2)_{10}COOH \longrightarrow (Ph_3P(CH_2)_{10}COOH)Br$$

This reaction was effected by mixing together 15 gms. omega bromoundecanoic acid and 14.5 gms. of triphenyl phosphine, transferring the mixture to a Carius tube which was then purged with nitrogen and sealed, and thereafter maintaining the mixture at a temperature of 160° C. for 9 hours. On cooling, a pale yellow glass-like product was obtained. Analysis of the product showed it to be triphenyl omega-carboxy-n-decyl phosphonium bromide.

*Analysis.*—C, 63.1%; H, 7.5%; P, 5.6%; acid equivalent, 528. Theoretical for $(Ph_3P(CH_2)_{10}CO_2H)Br$: C, 66.0%; H, 6.8%; P, 5.9%; acid equivalent, 527.

Preparation of stabilised polyamide 30 gms. of hexamethylene diammonium adipate were mixed with 4 mls. of a 0.0714 N aqueous solution of triphenyl omega-carboxy-n-decyl phosphonium bromide, prepared in the manner described above, this amount of the phosphonium bromide corresponding to ¼ mole percent. The resulting mixture was heated in a sealed tube (Carius tube) filled with nitrogen at 220° C. for two hours under pressure. The tube was then opened and the heating continued at 285° C. for a further period of 2 hours under atmospheric pressure, a stream of nitrogen being passed through the tube.

The resulting polyamide chips which were white in colour, were melt spun into yarn by known processes (cf. British patent specifications Nos. 533,306 and 533,307) which yarn was then hot drawn to 4.5 times its original length.

The inherent viscosity (I.V.) of the polyamide chips and that of the yarn were determined. The equilibrium dye uptake of the yarn was also measured. Further, by suitable titration methods, the residual amino end groups (abbreviated as A.E.G.) and the residual carboxy end groups (abbreviated as C.E.G.) in the polyamide chips, were also determined. The results are expressed as gram equivalents per $10^6$ gms. The above data are tabulated below, together with similar data relating to a polyamide made by using acetic acid as a stabiliser in place of the triphenyl omega-carboxy-n-decyl phosphonium bromide.

CHIP PROPERTIES

| Stabiliser | Triphenyl omega-carboxy n-decyl phosphonium bromide, ¼ mole percent | Acetic acid, ¼ mole percent |
|---|---|---|
| I.V. | 1.03 | 1.02 |
| A.E.G. | 27.5 | 28.5 |
| C.E.G. | 77.5 | 64.7 |
| Colour | White | White |

YARN PROPERTIES

| Stabiliser | Triphenyl omega-carboxy n-decyl phosphonium bromide, ¼ mole percent | Acetic acid, ¼ mole percent |
|---|---|---|
| I.V. | 0.88 | 1.0 |
| A.E.G. | 35.5 | 20.0 |
| C.E.G. | 70.0 | 76.5 |
| E.D.U. | 9.53 | 5.23 |

EXAMPLE 2

The procedure of Example 1 was repeated except that the mixture charged to the Carius tube consisted of 30 gms. of hexamethylene diammonium adipate and 8 mls. of a 0.0714 N aqueous solution of triphenyl omega-carboxy-n-decyl phosphonium bromide, this amount of phosphonium bromide corresponding to 0.5 mole percent.

The resulting polyamide chips which were white in colour, were melt spun into yarn at a temperature of 285° C. and the yarn hot drawn to 4.75 times its original length. The properties of the polyamide compared with those of a polyamide stabilised with acetic acid and of an unstabilised polyamide, are shown in the table below.

The yarn possessed a denier of 26, a tenacity of 5 gms./denier, an initial modulus of 27, and an extensibility of 23 percent.

| Stabiliser | Triphenyl omega-carboxy n-decyl phosphonium bromide, 0.5 mole percent | Acetic acid, 0.5 mole percent | None |
|---|---|---|---|
| I.V. (of yarn) | 1.1 | 1.1 | 0.93 |
| A.E.G | 20.0 | 25.6 | 56.0 |
| C.E.G | 76.5 | 61.5 | 53.0 |
| E.D.U.: | | | |
| (1) | 10.2 | 5.79 | ........ |
| (2) | 0.45 | 0.16 | ? |

Note: In the foregoing table E.D.U. (1) refers to polyamide yarn dyed with Solway Blue B.N. (registered trademark) at a pH of 4, and E.D.U. (2) to polyamide yarn dyed with the same dyestuff at pH 8. It will be observed from the foregoing figures that the triphenyl omega-carboxy-n-decyl phosphonium bromide not only acts as an efficient stabiliser but also affords a polyamide of enhanced dyeability in regard to anionic dyestuffs.

Furthermore, if yarn made with the phosphonium bromide as stabiliser is knitted into a fabric and dyed with a Solway Blue B.N. or Durazol Blue D.R., much deeper shades are obtained than in the case of fabric knitted from yarn of the polyamide made by using acetic acid as a stabiliser.

EXAMPLE 3

Preparation of tributyl omega-carboxy-n-decyl phosphonium bromide

Tributyl omega-carboxy-n-decyl phosphonium bromide is prepared by a reaction represented by the formula:

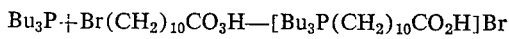

$$Bu_3P + Br(CH_2)_{10}CO_3H \longrightarrow [Bu_3P(CH_2)_{10}CO_2H]Br$$

This reaction was effected by mixing together 11.26 gms. of tributyl phosphine (prepared by the method described by W. C. Davies and W. J. Jones in J. Chem. Soc., 1929, 33) 14.50 gms. of n-bromo-undecanoic acid and 25 mls. of benzene, transferring the mixture to a Carius tube which was then purged with nitrogen and sealed, and thereafter maintaining the mixture was then allowed to cool when two layers separated out, the bottom of which, a pale yellow oil, was the phosphonium compound (acid equivalent found 475—theoretical acid equivalent 467).

Preparation of stabilised polymer 2,000 gms. of polyhexamethylene diammonium adipate were placed, together with 1,000 ml. of water and 35.6 gm. of tributyl omega-carboxy-n-decyl phosphonium bromide (corresponding to a molecular proportion of 1 percent) prepared in the reaction described hereinbefore, in a stainless steel autoclave heated by a jacket the latter being maintained at a temperature of 214° C. The air was swept from the autoclave by a current of oxygen-free nitrogen, and the autoclave closed by a loaded valve, arranged so that the pressure could not rise above 250 lbs. per square inch. The pressure was reached in the course of about 1 hour, and the heating continued for a further 60 minutes. The pressure was then allowed slowly to fall to one atmosphere. The temperature of the molten polyamide, now 285° C., was maintained for 50 minutes. The resulting polyamide was extruded as a ribbon, converted into chips and melt spun into yarn by known processes (British patent specifications Nos. 533,306 and 533,307.) The yarn was hot drawn to 4.5 times its original length.

The polyamide and the yarns derived therefrom compares as follows with a similar polyamide made employing acetic acid as a stabilizer instead of tributyl omega-carboxy-n-decyl phosphonium bromide.

YARN PROPERTIES

| Stabiliser | Tributyl omega-carboxy n-decyl phosphonium bromide (1 mole percent) | Acetic acid (1 mole percent) |
|---|---|---|
| Denier | 27.1 | 27.4 |
| Tenacity | 4.6 | 4.9 |
| Initial modulus | 27.4 | 28.2 |

CHIP PROPERTIES

| Stabiliser | Tributyl omega-carboxy n-decyl phosphonium bromide (1 mole percent) | Acetic acid (1 mole percent) |
|---|---|---|
| A.E.G | 20.0 | 17 |
| C.E.G | 83.5 | 56 |
| I.V | 0.95 | 0.98 |

The dyeability of the stabilised polyamide yarn was compared under different conditions of dyebath pH (Solway Blue B.N.) with the dyeability of acetic acid stabilised polyamide of similar I.V.

The comparison was effected by measuring the various equilibrium dye uptake values and the results tabulated in the form of a graph which is reproduced in the accompanying figure, wherein the wire labelled A represents the dyeability of yarn derived from the stabilised polyamide of the invention, while the curve labelled B represents the dyeability of yarn derived from acetic acid stabilised polyamide. Not only is the superior dyeability of the phosphonium stabilised polamide evident but it will be observed that it also has an affinity for the anionic dyestuff under alkaline dyebath conditions (pH 8). At this pH the Solway Blue B.N dyestuff dyes the phosphonium stabilised polyamide yarn in bright blue shades, whereas under the same conditions the acetic acid stabilised polyamide yarn is only slightly coloured.

The enhanced dyeability of the phosphonium stabilised polyamide yarn under alkaline conditions is attributed to the presence in the polyamide of phosphonium end groups. NHCO—$(CH_2)_{10}$—$(PBu_3)Br$ which are sufficiently basic to accept anionic dyestuffs under conditions where the amino end groups obtained in acetic acid stabilised polyamide polymers are not sufficiently basic to accept the dye.

What is claimed is:

1. A high molecular weight linear polyamide consisting essentially of the product obtained by the condensation polymerization of a member of the group consisting of an amino acid, a mixture of a diamine and a carboxylic acid, and amide-forming functional derivatives of said amino acid, diamine and carboxylic acid, said polyamide containing, a viscosity stabilizer, and chemically reacted therewith from 0.01 to 2 mole percent of a monofunctional amide-forming phosphonium compound of the general formula:

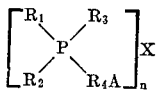

wherein at least one of $R_1$, $R_2$ and $R_3$ are hydrocarbon groups while the other or others are hydrogen atoms, $R_4$ is an alkylene group, A is a carboxylic acid group, X is halide and $n$ has the value 1.

2. The polyamide of claim 1 in the form of a filament or film.

References Cited

UNITED STATES PATENTS

| | | | |
|---|---|---|---|
| 3,296,216 | 1/1967 | Snooks | 260—78 |
| 3,300,448 | 1/1967 | Gauthier et al. | 260—78 |
| 2,174,527 | 10/1939 | Peterson | 260—78 |
| 2,973,343 | 2/1961 | Ney. | |

HAROLD D. ANDERSON, Primary Examiner

U.S. Cl. X.R.

8—55; 57—140; 161—172